United States Patent [19]

Mohle

[11] Patent Number: 5,518,606
[45] Date of Patent: May 21, 1996

[54] METHOD FOR TREATING PITCH

[75] Inventor: Dwight R. Mohle, Borger, Tex.

[73] Assignee: Phillips Petroleum Company, Bartlesville, Okla.

[21] Appl. No.: 283,334

[22] Filed: Aug. 1, 1994

[51] Int. Cl.$^6$ ........................................ C01C 3/00
[52] U.S. Cl. ............................ 208/45; 208/39; 134/20; 210/773
[58] Field of Search .......................... 208/45, 39, 20; 134/20; 210/773, 209

[56] References Cited

U.S. PATENT DOCUMENTS

| | | | |
|---|---|---|---|
| 2,218,365 | 10/1940 | Taylor | 210/773 |
| 3,068,167 | 12/1962 | White | 210/773 |
| 3,774,760 | 11/1973 | Berislain et al. | 210/66 |
| 3,923,653 | 12/1975 | Lavins, Jr. | 210/71 |
| 3,951,779 | 4/1976 | Anderson | 208/11 LE |
| 4,019,984 | 4/1977 | Mohn | 210/66 |
| 4,096,057 | 6/1978 | Porritt et al. | 208/11 LE |
| 4,139,462 | 2/1979 | Sample, Jr. | 210/72 |
| 4,225,094 | 9/1980 | Halldorson et al. | 241/79 |
| 4,655,937 | 4/1987 | Hendrix | 210/772 |
| 4,875,998 | 10/1989 | Rendall | 208/390 |
| 4,996,685 | 10/1990 | Hall et al. | 209/390 |
| 5,008,085 | 4/1991 | Bain et al. | 422/109 |
| 5,721,851 | 12/1993 | Nelson et al. | 210/770 |

Primary Examiner—Helane Myers
Attorney, Agent, or Firm—George E. Bogatie

[57] ABSTRACT

Solid debris of rocks and scrap metal, etc., which are embedded in recoverable petroleum material such as solid or semisolid pitch or tar deposits, are separated from the petroleum material by a high pressure spray carried out in a closed separation vessel. The separation vessel includes a removable screen container for the solid petroleum material through which the material is sprayed with a heated liquid solvent using high pressure nozzles to melt and/or dissolve the pitch so that it flows through the screen container and is collected in a sump at the bottom of the separation vessel.

9 Claims, 1 Drawing Sheet

METHOD FOR TREATING PITCH

This invention relates generally to separating debris embedded in solid pitch. More specifically, this invention relates to apparatus and method for melting or dissolving solid pitch to form a flowable hydrocarbon mixture. In another aspect this invention relates to a separation vessel for removing debris from solid pitch.

BACKGROUND OF THE INVENTION

Many petroleum refining processes are known for the recovery of hydrocarbon material from solid and semi-solid petroleum resources such as asphalt, tar, pitch and many other substances, where the substance is processed or reprocessed in the refinery into a more valuable sellable product, and a residue meeting environmental regulatory agency requirements for disposal in solid waste landfills. These valuable solid or semi-solid substances, however, may present special handling problems in preparation for recovery of usable hydrocarbon material in a petroleum refinery.

While deposits of solid or semi-solid petroleum resources occur naturally in the earth's crust, recoverable resources of asphalt, tar and pitch may also result from man-made deposits such as recovery from deposits of previously discarded distillation residue, or recovery of road asphalt, etc. In any of the above-mentioned solid or semi-solid petroleum resource deposits, there is likely to be found solid debris including rocks of various sizes, discarded metal or glass objects, etc., and these debris contained in the petroleum substance cause damage to refinery equipment if the debris is not removed prior to feeding the petroleum substance into the refinery equipment.

Attempts to separate debris from pitch by heating the material to be recovered using a heat exchange surface and then screening the debris have met with little success because the screen rapidly becomes plugged with sticky material, the heat exchange equipment also becomes plugged and fouls, and the rotating equipment used to move the pitch jams on the debris contained in the pitch.

Accordingly, it is an object of this invention to improve the apparatus used for removing debris contained in pitch to be processed in a refinery.

Another object of this invention is to operate a screening apparatus for removing debris contained in pitch in a manner that prevents plugging of the screen with pitch.

A further object is to melt the pitch without the pitch contacting a solid heat exchange surface.

A still further object of this invention is to dislodge debris from solid pitch.

Additional objects, advantages and novel features of the invention will become apparent to those skilled in the art from the following detailed description of the invention, the appended claims and the drawing which is briefly described as follows:

SUMMARY OF THE INVENTION

Figure 1:
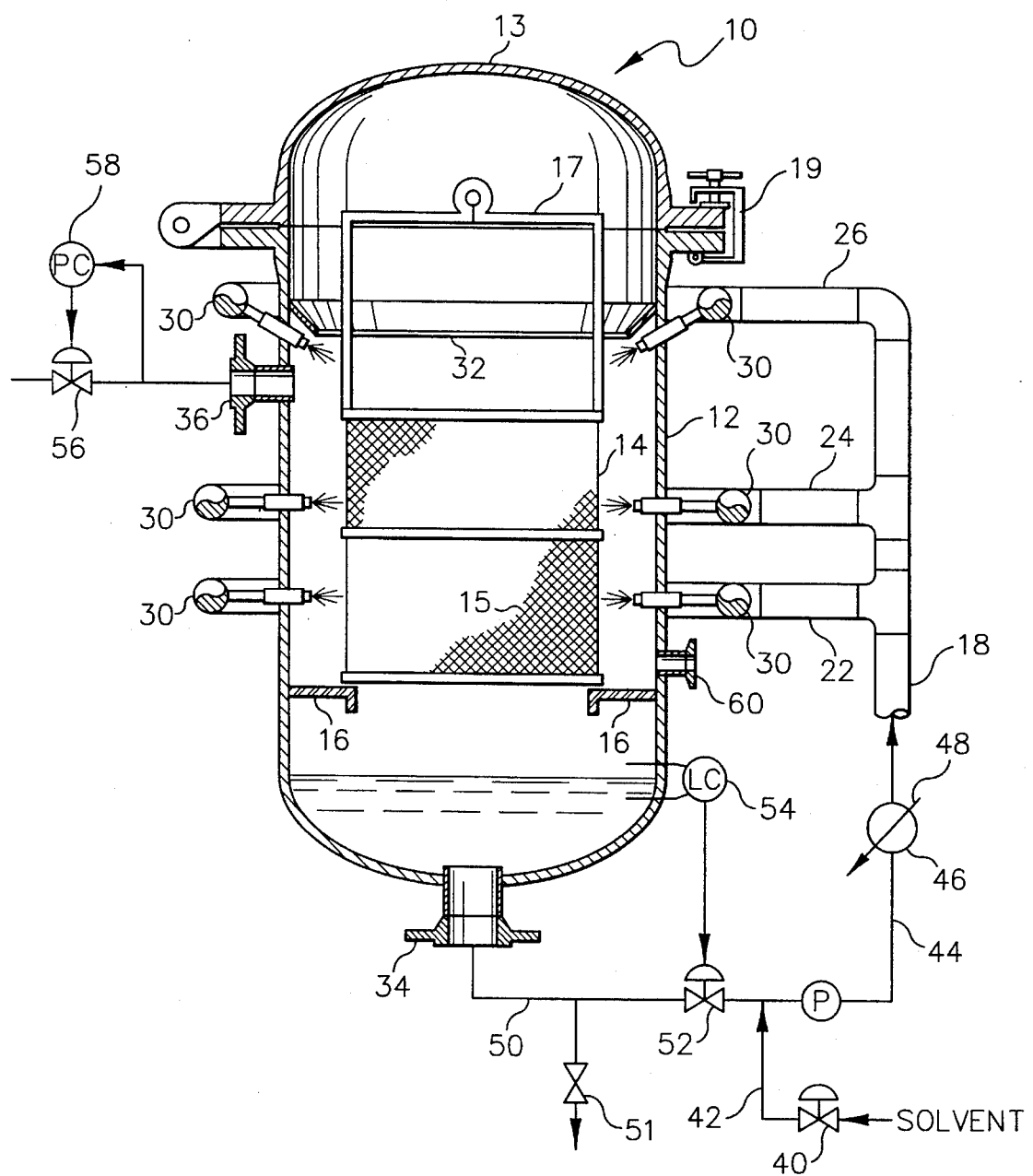
FIG. 1 is a vertical cross-section of a presently preferred embodiment of the invention.

A method for removing debris embedded in solid pitch comprises a first step of loading a mass of the debris-laden pitch into a screen container having a mesh size that will prevent passage of the debris through the screen. The container is positioned within a separation vessel, and the debris-laden pitch is then pressure sprayed from multiple directions with a heated liquid solvent to heat the pitch to its melting temperature and form a flowable liquid material. The heated liquid solvent used for melting the pitch, which is preferably later recovered in a refinery operation, is pressure sprayed through the screen of the screen container thereby preventing plugging of the screen with sticky semi-solid pitch. After the mass of pitch in the screen container has been melted, flowable and dissolved pitch is collected at the bottom of the separation vessel through a sump, and then transported to a petroleum refinery for processing, while the debris is retained within the screen container for disposal in any suitable manner.

In accordance with another aspect of the invention an apparatus comprises a separation vessel having a removable screen container with the mesh of the screen sized to contain the smallest debris to be separated. The separation vessel further includes means for spraying a heated liquid solvent through the screen to impinge on the solid pitch, and a sump for removing flowable liquid from the separation vessel.

In preferred embodiments, the separation vessel further includes multiple spray nozzles protruding through the walls of the vessel, a guard ring to prevent the removable screen container from contacting the protruding nozzles while being lowered into or lifted out of the separation vessel, a cover plate or lid which is secured by clamps, a port for venting gases which may be generated during heating of the solid pitch, means for maintaining a bottom liquid seal, means for pressuring the separation vessel, and means for purging the separation vessel.

DETAILED DESCRIPTION OF THE INVENTION

Any processable hydrocarbon material which is substantially solid at ordinary ambient temperatures and which contains solid debris, can be treated according to this invention. The terms tar, pitch and asphalt are generally included, however, the differentiation between these terms is not precise. As used herein the term "pitch" is meant to include any processable hydrocarbon material which is substantially solid at ordinary ambient temperatures.

Referring now to FIG. 1, the apparatus of this invention is shown in cross-section to more clearly illustrate the claimed apparatus and method. The apparatus includes a separation vessel 10 which is configured as a cylindrical, generally vertically-oriented vessel having a side wall 12. The separation vessel 10 is sealed at its upper end by top 13 which can be a cover plate or a hinged lid secured by a clamp 19 as illustrated, or any other suitable means.

A cylindrical screen container for the debris-laden pitch is shown as 14. The screen container 14, which is removable from the vessel 10 through the top 13, is illustrated positioned coaxially inside the vessel walls 12, which is the preferred position for carrying out the separation according to the invention. The screen container 14, as shown, rests on supports 16 located in the lower quarter of the vessel 10. In some arrangements, however, it may be desirable to locate the screen container supports in the upper part of the vessel.

An arrangement of nozzles 30, which will typically include from about 10 to about 30 nozzles, directs heated liquid solvent from multiple directions to pressure spray the entire mass of pitch in screen container 14. The nozzles 30, which project through the vessel walls 12, provide a high shear environment within screen container 14 by pressure spraying the heated liquid which can be a solvent or a diluent for the pitch. The heated liquid solvent is sprayed through the mesh 15 of the screen container 14 to contact the debris-laden pitch in screen container 14. Nozzle spray pressures from 10 to 10,000 psi provide a critical range of operating pressures, with 100 to 1000 psi being preferred. The objective in view of operating at such nozzle pressures is to provide an impingement of the heated liquid solvent on the pitch that actually mechanically dislodges the pitch from the debris as well as preventing plugging of the mesh 15 of the screen container 14 with pitch. The actual pressure used will depend on the characteristics of the pitch being treated and the type and amount of debris contained in the pitch. Further, this pressure range is effective for carrying flowable pitch outwardly where it can escape through the mesh 15 of screen container 14, and for rapidly dissolving the pitch. Any desired spray pattern that effectively melts the pitch may be used. Preferably nozzles which provide a solid cone pattern are used for rapidly melting the solid pitch.

Fabrication of the screen container 14 from reinforcing bar or similar material readily accommodates the screen container 14 to function in the environment encountered in the separation vessel 10.

Conduit means 18 in combination with conduit means 22, 24 and 26 which branch from conduit means 18, supply the heated liquid solvent which is dispersed through the arrangement of nozzles 30. Preferably the solvent is recycled as explained more fully hereinafter.

As illustrated in FIG. 1, solvent is supplied to the nozzles 30 through a manual valve 40 via the combination of conduits 42, 44 and 18. Heat exchanger 46, which is supplied with a suitable heating source such as steam through conduit 48, is operably located in conduit 44. Alternately a heating source such as an electric or a fired source could be employed. After a suitable supply of solvent has been charged to the vessel 10, valve 40 is closed and recycle of a mixture of solvent and dissolved flowable pitch is effected through conduit 50. The recycle stream is withdrawn from the separation vessel 10 through conduit 50 and is controlled via control valve 52 which is manipulated by the level controller 54 opening the control valve 52 whenever the liquid level in the bottom of separation vessel 10 rises above a desired level.

Flow rates of from 0.5 to 5.0 gallons per minute for each nozzle 30 provides a useful range of flow rates, with 1.0 to 3.0 gallons per minute per each of typically 18 to 20 sprays would be recommended to treat e.g. a 300 pound mass of solid pitch in screen container 14. The particular spray pattern and flow rate used are not critical. The objective is to uniformly spray the heated fluid over the mass of debris laden pitch in screen container 14.

Other arrangements of spray nozzles will efficiently separate the debris from the pitch. For example a rotating jet spray nozzle may be used which produces the rotating effect as a result of the jet spray action. Still other nozzle arrangements such as nozzles recessed in the vessel walls 12, nozzles in the covering lid 13, or even nozzles in the screen container are possible. These other nozzle arrangements, however, would have different flow rate requirements compared to the protruding nozzles.

In a preferred embodiment, pressure control for the separation vessel 10 is provided by pressure controller 58, control valve 56, vent port 36, inlet port 60, and the liquid seal for sump 34. The vent stream withdrawn through vent 36 is controlled via control valve 56 which is manipulated by the pressure controller 58 holding valve 56 closed whenever the pressure in vessel 10 is below a desired pressure. Inlet port 60 is provided for pressuring the vessel 10 with a suitable gas when it is desired to spray liquid diluent onto the pitch at a temperature that is above the atmospheric boiling point of the solvent being used. Inlet port 60 and vent port 36 are also useful for purging the vessel 10 with an inert gas such as nitrogen or cooling the vessel 10 prior to opening.

Also illustrated in FIG. 1 is a guard ring 32 which is provided to prevent the protruding nozzles 30 from being damaged by contact with the screen container during loading and unloading operations. Further illustrated in FIG. 1 is a sump 34 for removing a mixture of flowable as dissolved pitch and solvent, a port 36 for venting gases during a separation process or purging gases after the separation is completed. Also illustrated is a drain valve 51 to empty the vessel.

The first step in the method to separate the debris embedded in the solid pitch is to load the material to be treated into the screen container 14. Loading can be accomplished by an excavation shovel, other earth moving equipment, conveyor or any equipment capable of lifting the material to be treated. The loaded screen container is then lowered into the vessel 10 using the bracket 17 as a lifting point, until it rests on support 16.

Once the loaded screen container 14 is sealed inside the separation vessel 10, heated liquid solvents or diluents are pressure sprayed on the material to be treated in the screen container 14. This is preferably performed by multiple nozzles 30 arranged such that the heated liquid impinges on the solid pitch and inrushes therethrough to melt the pitch and carry the dissolved and flowable pitch through the mesh 15 of the screened container 14.

The melting process for the solid pitch relies on treatment with a suitable heated liquid solvent. Generally the solvent used will be at a temperature in a range of about 150° F. to about 450° F., and more preferably in a temperature range of 200° F. to about 300° F.

The solvent that can be used can be selected from the group of solvents including: carbon tetrachloride, methylchloroform, trichloroethylene, perchloroethylene, benzene, toluene, xylene, aromatic hydrocarbons containing from 1 to 3 chlorine atoms, and saturated or unsaturated hydrocarbons from five (5) through fourteen (14) carbon atoms per molecule.

Any of these above petroleum distillate solvents will work successfully. However, for commercial operations readily available liquids such as kerosenes, gas oils, and cycle oils are preferred.

It will be appreciated by those skilled in the art that many items of equipment which would be needed for successful operation of a commercial plant have been omitted for the sake of clarity. Such items of equipment would include for example, temperature, and flow measurement with corresponding controllers, and additional pressure measurements, additional heat exchangers, additional pumps, additional valves, etc. All of these items would be provided in accordance with standard chemical engineering practice to maintain desired conditions throughout the operation, but are not necessary to describe the present invention.

Reasonable variations and modifications of this invention are possible by those skilled in the art, and such variations and modifications are within the scope of the disclosure and the appended claims.

That which is claimed:

1. A method for separating debris from debris-laden solid pitch, wherein the separation is carried out in a separation vessel, said method comprising:

introducing said debris-laden solid pitch to be treated into a screened container having a mesh size to contain said debris;

placing said screen container loaded with said debris-laden solid pitch inside said separation vessel; and separating debris from said debris-laden solid pitch by pressure spraying a heated liquid through the screen of said screen container for heating said pitch to its melting temperature so as to form a flowable liquid which passes through the screen, while said debris is trapped within said screen container.

2. A method in accordance with claim 1, wherein said heated liquid is selected from the group of petroleum distillates consisting of kerosene, gas oil and cycle oil.

3. A method in accordance with claim 1 additionally comprising the steps of:

withdrawing a recycle stream comprising said flowable liquid from the bottom of said separation vessel; and controlling the flow of said recycle stream responsive to a liquid level controller operatively installed on said separation vessel.

4. A method in accordance with claim 1, wherein said separation vessel is equipped with a spraying means comprising a plurality of nozzles mounted on said separation vessel, said nozzles being arranged to spray said debris-laden solid pitch from multiple directions, said method additionally comprising:

using said spraying means for spraying said debris-laded pitch from multiple directions at a spray pressure in a range of about 10 psi to about 10,000 psi.

5. A method in accordance with claim 4, wherein said spray pressure is sufficient to dislodge the pitch from said debris.

6. A method in accordance with claim 4, wherein said range of spray pressure is a range of about 100 psi to about 1,000 psi.

7. A method in accordance with claim 1, wherein said heated liquid is sprayed onto said debris-laden pitch at a temperature in a range of about 150° F. to about 450° F.

8. A method in accordance with claim 1, wherein said heated liquid is sprayed onto said debris-laden pitch at a temperature in a range of about 200° F. to about 300° F.

9. A method in accordance with claim 1, wherein said debris is selected from the group of debris consisting of rocks, discarded metal objects, and discarded glass objects, and wherein the mesh size of said screen container is selected to contain the smallest debris to be separated.

* * * * *

UNITED STATES PATENT AND TRADEMARK OFFICE
CERTIFICATE OF CORRECTION

PATENT NO. : 5,518,606

DATED : May 21, 1996

INVENTOR(S) : Thomas A. Morgan and Dwight R. Mohle

It is certified that error appears in the above-indentified patent and that said Letters Patent is hereby corrected as shown below:

Cover Page: , item "[75] Inventor:" before "Dwight R. Mohle, Borger, Tex." insert --- Thomas A. Morgan, Pampa, Tx.--

Signed and Sealed this

Twenty-fourth Day of June, 1997

Attest:

Attesting Officer

BRUCE LEHMAN

Commissioner of Patents and Trademarks